June 3, 1952 L. A. KILLE 2,599,392

RECORDING DEVICE

Filed Sept. 5, 1947 4 Sheets-Sheet 1

INVENTOR
L. A. KILLE
BY John A. Hall
ATTORNEY

June 3, 1952 L. A. KILLE 2,599,392

RECORDING DEVICE

Filed Sept. 5, 1947 4 Sheets-Sheet 2

INVENTOR
L. A. KILLE
BY John A. Hall
ATTORNEY

June 3, 1952 L. A. KILLE 2,599,392

RECORDING DEVICE

Filed Sept. 5, 1947 4 Sheets-Sheet 3

INVENTOR
L. A. KILLE
BY John A. Hall
ATTORNEY

June 3, 1952 L. A. KILLE 2,599,392

RECORDING DEVICE

Filed Sept. 5, 1947 4 Sheets-Sheet 4

INVENTOR
L. A. KILLE
BY [signature]
ATTORNEY

Patented June 3, 1952 2,599,392

UNITED STATES PATENT OFFICE 2,599,392

RECORDING DEVICE

Lindley A. Kille, Morristown, N. J., assignor to Bell Telephone Laboratories, Incorporated, New York, N. Y., a corporation of New York Application September 5, 1947, Serial No. 772,301

6 Claims. (Cl. 164—113)

This invention relates to recording devices and particularly to means for insuring the probable correctness of a record in the process of its production.

The guiding principle of the present invention is to be found in the laws of probability and may be stated simply as, whereas the probability that even a trained operator may occasionally commit an error is reasonably certain, the probability that two trained operators will simultaneously commit the same error is remote.

The object of the invention is to provide means which will insure the probable correct formation of a record and which will automatically fail to record an error. Another, and more specific object is to insure the preparation of a perforated tape when and only when a correct code is offered for recording.

In accordance with this invention, two operators' keyboards are provided which are combined with a matching circuit and a single tape perforator. Two operators simultaneously write up the same information, the output of one keyboard is matched against the output of the other and if and only if the match is perfect, the information is recorded by the tape perforator.

Each keyboard has a bank of keys each of which when operated will remain in its operated position until automatically released. The releasing means is under control of the matching means and automatically responds when the two operators simultaneously operate like keys, so as to prepare the key sets for the next operation, whereby a pair of skilled operators may record prearranged information at a satisfactory speed.

Each key hereinabove set forth is arranged to transmit a code consisting of a fixed plurality of elements. In addition there is provided at each key set a plurality of code element keys whereby the operators may create codes for transmission. By this means, mutilated or erroneous codes may be produced and will be transmitted and recorded when and if the two operators simultaneously form the same code, either perfect or mutilated. Thus codes mutilated by operator agreement may be produced.

Another feature of the present invention is a means for repeatedly recording the same code without having to key it repeatedly. In accordance with this feature the key releasing means may be disabled so that the keys operated will not be automatically released when a match has been attained and the code recorded.

Another feature is a means to release the control operator's key set from the teamwork control whereby it may be used as a single control.

The drawings consist of four sheets having six figures as follows:

Figs. 1, 2, 3 and 4 arranged as shown in Fig. 6 form a complete schematic circuit diagram of the elements of the present invention and in which:

Figures 3, 5:
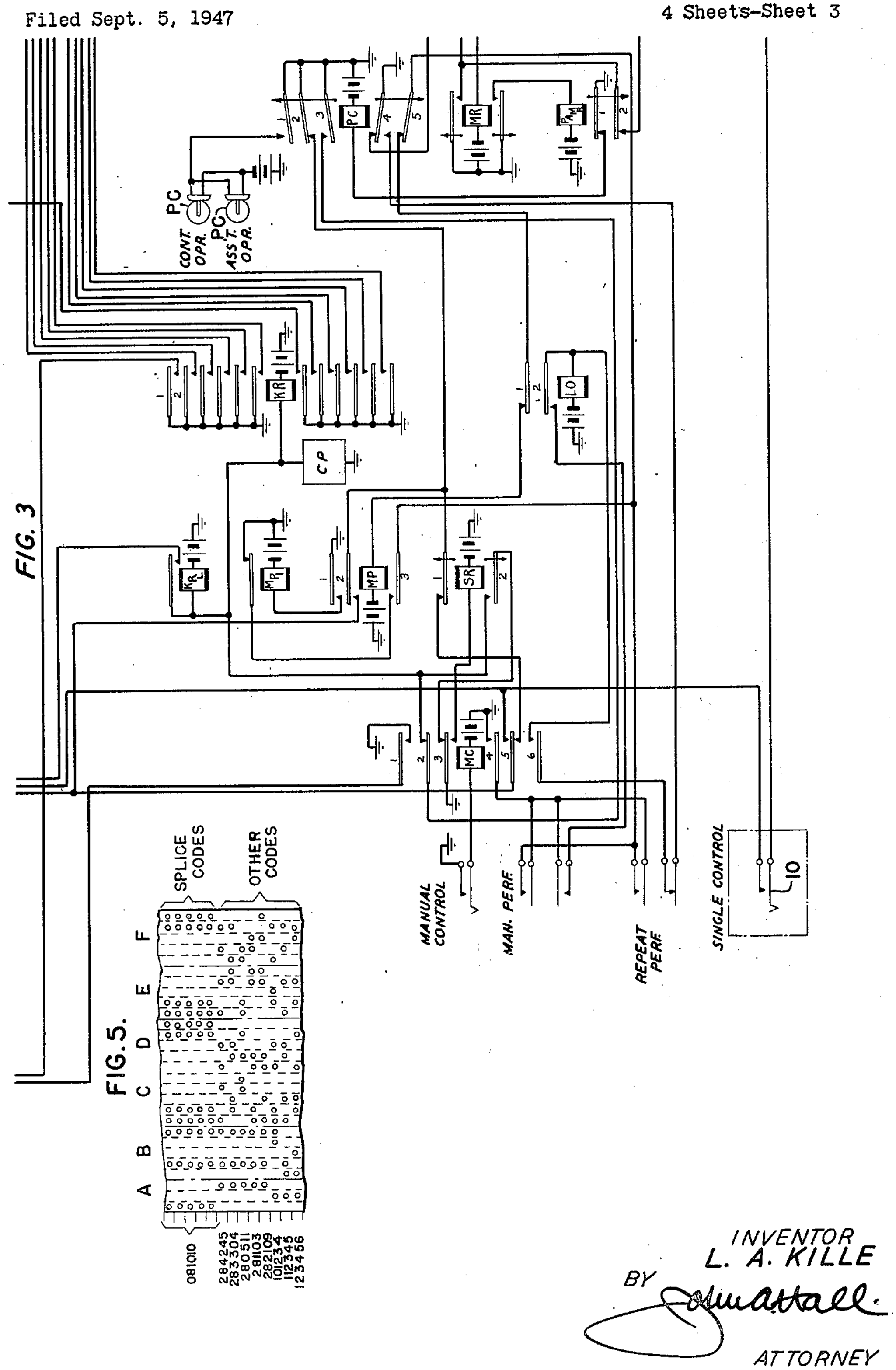
Fig. 3 shows the relay control means.
Figure 4:
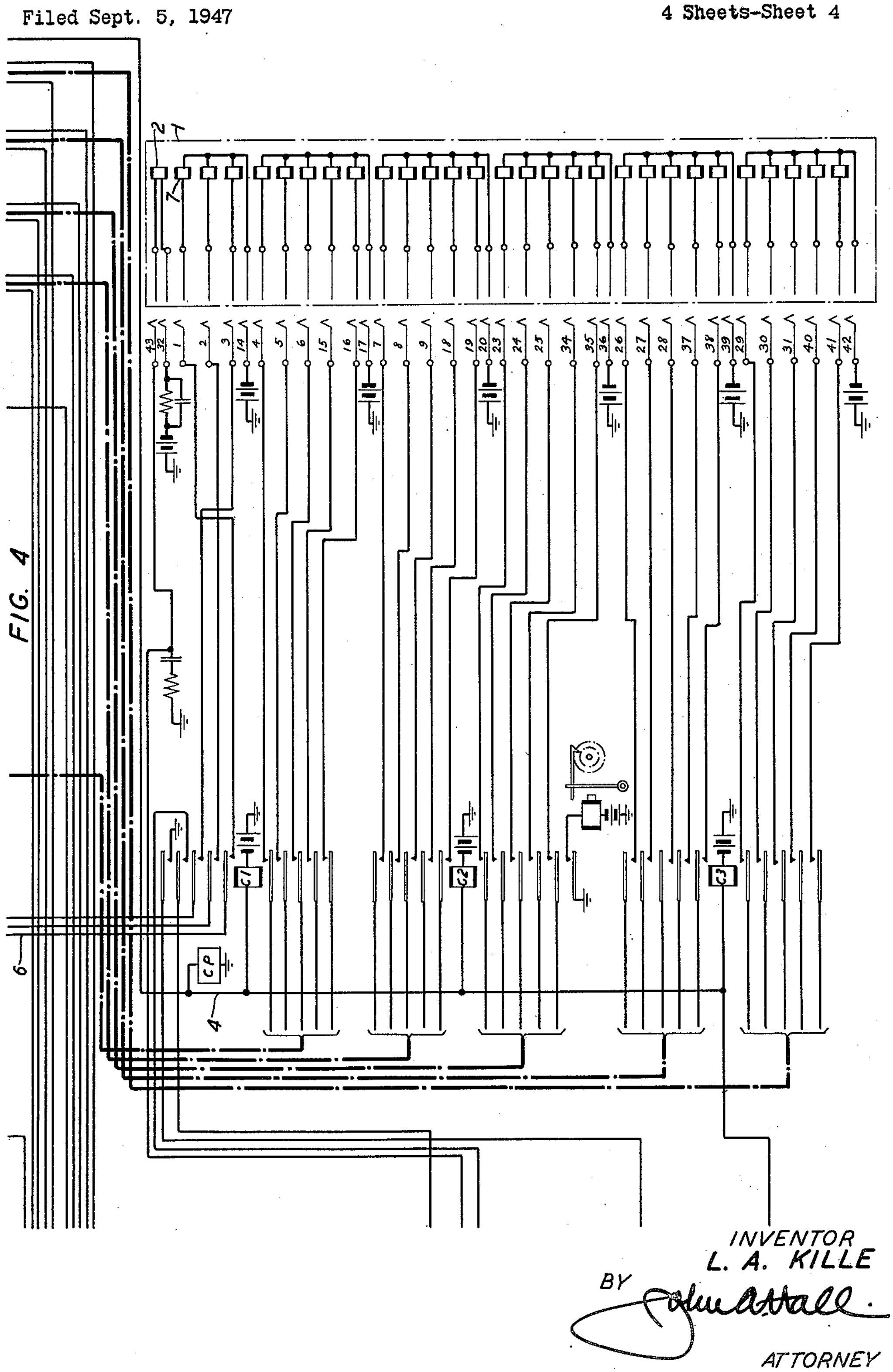
Fig. 4 shows the cut-in relays and indicates the perforator.

Fig. 5 exemplifies a short piece of perforated tape; and

Figures 1, 6:
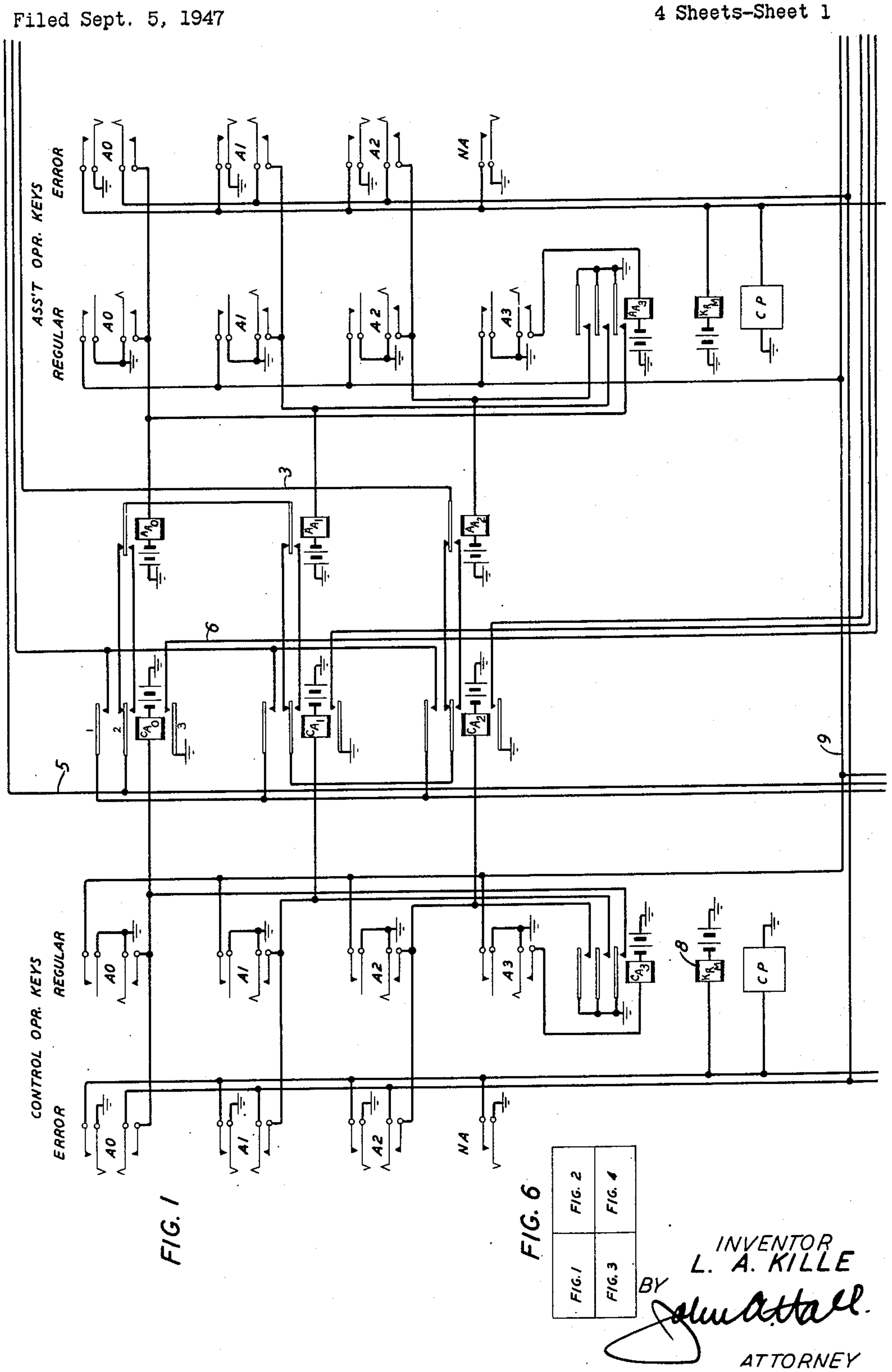
Fig. 1 shows the keys and relays for the A digit at both the control operator's position and the assistant operator's position.
Figure 2:
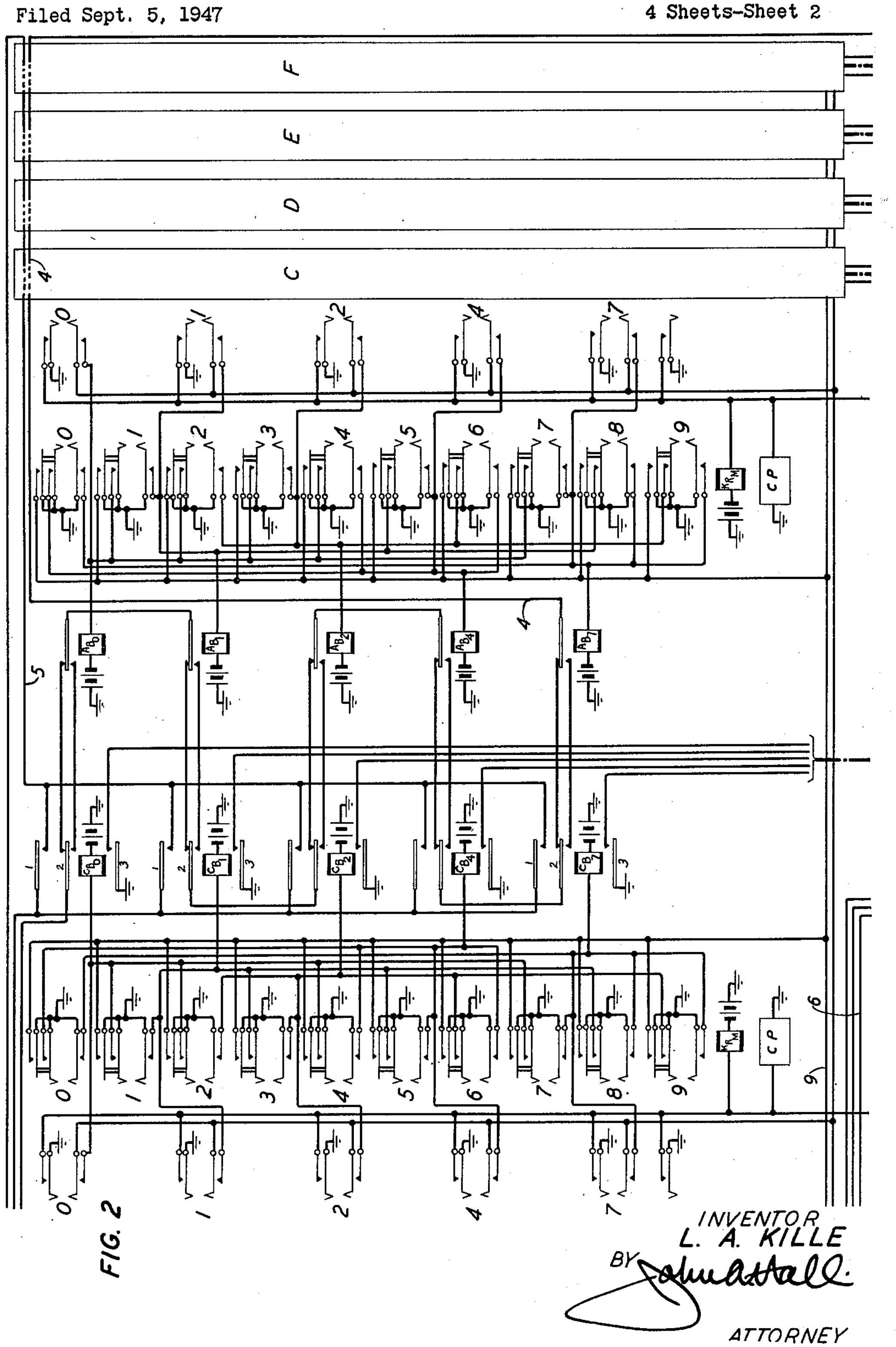
Fig. 2 shows in full the keys and relays for the digit B of the two operators' positions and indicates similar arrangements for the C, D, E and F digits.

Fig. 6 shows the arrangement of Figs. 1, 2, 3 and 4 as hereinabove set forth.

The device of the present invention provides means for the fabrication of test tapes used in an automatic message accounting system. These test tapes are ones which are made by hand in order to test the operation of the various units of the automatic message accounting system. The device consists of two separate key sets mounted on a common table which also mounts necessary control keys, lamps and relays and is associated with a conventional perforator cabinet.

In the perforation of automatic message accounting tape according to one type of coded information which may be used, twenty-eight possible code hole positions are provided for each line and each line consists of six digits arbitrarily designated A, B, C, D, E and F. In all digits B to F, inclusive, five code hole positions for each digit are provided and any one of the ten digits can be perforated according to a two-out-of-five additive code in which the code holes for each digit are designated 0, 1, 2, 4 and 7 and in which:

| | |
|---|---|
| 0=4 and 7 | 5=4 and 1 |
| 1=1 and 0 | 6=4 and 2 |
| 2=2 and 0 | 7=7 and 0 |
| 3=2 and 1 | 8=7 and 1 |
| 4=4 and 0 | 9=7 and 2 |

In the A digit the numbers 0, 1, 2 or 3 only can be perforated according to a code in which three code holes only are used designated 0, 1 and 2 and in which:

| | |
|---|---|
| 0=0 | 2=2 |
| 1=1 | 3=0, 1 and 2 |

In Fig. 5 a short piece of tape is exemplified and broken lines have been drawn lengthwise along this tape, in order to illustrate the three positions for the A digit and the five positions for each of the remaining digits. In the top line a code for 081010 is shown by way of example. This shows a hole punched in the 0 position of the A digit, two holes punched in the 1 and 7 positions of the B digit, two holes punched in the 0 and 1 positions of the C digit, two holes punched in the 4 and 7 positions of the D digit, two holes punched in the 0 and 1 positions of the E digit and two holes punched in the 4 and 7 positions of the F digit. This particular code 081010 is known as a splice code and as illustrated herein is generally repeated a number of times prior to the perforation of the codes representing other items of information, such as the other codes shown perforated in the tape of Fig. 5.

The exemplary embodiment of the invention disclosed herein utilizes the so-called two-out-of-five code and utilizes some twenty-eight recording magnets for the purpose of producing a tape which might look like that illustrated in Fig. 5. The present invention is in no way limited to any particular type of code or to any particular number of code elements on the recording medium and furthermore is not limited to any particular type of recording medium, since it will be obvious to those skilled in the art that the recording magnets shown in Fig. 4 could be used to produce a record in media other than a perforated tape.

In order to insure probable accuracy two operators are employed. These operators work from duplicate typed lists of entry numbers. The tape to be perforated may be either a normal tape or an error tape, that is, a mutilated code tape. A normal tape as used in this description is one which contains two and two only perforations in the B, C, D, E and F digits and one and one only or all three perforations in the A digit. An error tape is one containing too few or too many perforations in one or more digits.

Each operator's key set contains fifty-four regular push-button type mechanically locking and electrically releasing key buttons. These keys are numered 0 to 9 for the B, C, D, E and F digits and 0 to 3 for the A digit. These key buttons are used for producing normal digits containing two and two only perforations in the B to F digits and one and one only or all three perforations in the A digits. Each operator's key set also contains thirty-four error lever type locking keys used only for producing defective digits. Twenty-eight of these errors keys are designated 0, 1, 2, 4 and 7 for the B to F digits and 0, 1 and 2 for the A digit. Each of these keys when operated causes the perforation of one hole in its particular digit as indicated by the designations 0, 1, 2, 4 and 7. The remaining six error keys are designated NA, NB, NC, ND, NE and NF. Each of these keys when operated performs no function other than to provide a positive operation for the digit and to insure the release of the regular keys for its respective digit. The defective line when perforated as subsequently described will, however, contain a blank space for the digit in which the N key only has been operated.

In the perforation of normal tapes the six digits of each entry line are keyed up on the operator key sets by the operators line by line using the mechanically locking regular push-button type keys. When all six digits of any particular line as keyed by the two operators agree, the line is automatically perforated and perforate control (PC) lamps in front of the two operators flash to indicate perforation and the operated keys of both operators' key sets are automatically restored. The two operators then key the next line and this process is continued so long as both operators key matching lines, the speed of operation being limited only by the accurate speed of the slower of the two operators. In case one operator keys inaccurately, perforation will not occur, the perforate control (PC) lamps will not flash, and the operators' keys will not be restored. The operators will then determine which key has been wrongly operated. The inaccuracy may be corrected by operating the correct key whereupon perforation and the automatic restoration of the operators' keys will occur and the normal process of automatic perforation will continue as before until a subsequent mistake is made by either operator.

To produce error tapes it is necessary to operate the manual control key before keying up the line in which the defective digit is desired. The operation of the manual control key enables the error lever type locking keys by connecting ground to key contacts making these keys effective for writing up errors in any digit. Digits other than defective digits are keyed as usual on the regular keys. The operation of the manual control key also alters the control of the circuit so that after both operators have correctly keyed a particular line, perforation will not occur until the manual perforation key is operated and after perforation any regular keys which are operated will not automatically restore. This manual control feature is necessary in perforating error lines since the use of locking keys for registering the individual holes of the defective digits might otherwise cause premature perforations due to accidental matches during keying. The manual control key is also operated for making repetitive lines such as the splice pattern hereinbefore described. In this case the repeat perforation key will usually be operated in place of the manual perforation key. The circuit will then cause the perforation of successive lines of any digits set up on the operators' keys at a speed of about three per second so long as the repeat perforation key remains operated.

With the single control key 10 operated the circuit will perform any of the operations mentioned above except that the operation of the control operator's keys only is required. In this case there is, of course, no check on the accuracy of the operator's keying.

To prepare this circuit for operation, a suitable perforator is plugged into the jack of this circuit and a power switch (not shown) is operated to activate the device. The perforator is herein indicated in Fig. 4 in the broken line rectangle 1 in which twenty-nine magnets connected to plugs are shown. The top magnet 2 is the tape advance magnet and the other twenty-eight magnets are those which cause the perforations in the twenty-eight positions of the tape. The separate battery supplies for these magnets are grouped in accordance with the digits but has no significance other than usual engineering precautions against overloading circuits.

There are also shown in the figure three relays designated C1, C2 and C3 which are connected in parallel and operate simultaneously as the equivalent of a single multi-contact relay. A rectangle shown connected to the conductor leading to the operated windings of the C1, C2 and C3 relays and marked CP represents a conventional contact protection network provided to minimize the sparking at the contacts of the relays which operate this circuit.

As each line is written up by the two operators on the regular keys the operation of one key in each digit by each operator operates two out of five register relays in the B, C, D, E and F digits and one out of three or all three register relays in the A digit. We will assume by way of example that both operators have written the number 081010 on their keys. Therefore, in Fig. 1 the key designated A0 in the regular column of the control operator's keys and the key designated A0 in the regular column of the assistant operator's keys have been operated. Likewise, in the B position the key designated 8 in the original column of the control operator's keys and the key designated 8 in the regular column of the assistant operator's keys have been operated. Similar operations in the other digits will be assumed. Thereupon, a circuit will be established from ground, armature 2 and front contact of the PC relay (normally operated), armature 1 and back contact of the SR relay, back contact and armature 5 of the MC relay, armature 1 and front contact of the CA0 relay, armature 1 and front contact of the CB1 relay and in parallel therewith armature 1 and front contact of the CB7 relay, thence through similar circuits over conductor 5 in each of the C, D, E and F digits back to armature 2 and front contact of the CA0 relay, front contact and armature of the AA0 relay and thence in series through back contacts and armatures of the AA1, the CA1, the CA2 and the AA2 relays to conductor 3 leading to a similar circuit in the B digit position where it may be traced through armature 2 and back contact of the CB0 relay, back contact and armature of AB0 relay, armature and front contact of the AB1 relay, front contact and armature 2 of the CB1 relay, armatures and back contacts of relays CB2, AB2, AB4, CB4, armatures and front contacts of relays CB7 and AB7 to conductor 4 which may now be traced in series through similar circuits indicated in the C, D, E and F digits to the windings of relays C1, C2 and C3 in parallel and thence to battery. It will be noted that this circuit will be closed to cause the operation of the cut-in relays C1, C2 and C3 only if some one relay such as CA0 in each of the digits has been operated and only if when such a relay as CA0 has been operated its companion AA0 is also operated. In each position the relays such as CA0 and AA0 are in pairs and both relays of a pair must be operated, for one breaks the continuity of the circuit and the other repairs this break.

The operation of relays C1, C2 and C3 connects grounds supplied from the operated C register relays to operate the perforator punch magnets. By way of example, the operation of the relay CA0 through its armature 3 extends ground over the conductor 6, upper innermost armature and front contact of the relay C1, jack spring numbered 1, the zero perforator magnet 7 for the A digit to battery. For each of the C relays such as CA0 or CB1 a corresponding perforator magnet is operated.

Relay C1 operated also connects ground to operate the perforator advance magnet in a circuit which may be traced from ground, front contact and upper outermost armature of relay C1, back contact and armature 2 of PAMR relay (perforator advance magnet relay), perforator jack spring 43, perforator advance magnet 2, perforator jack spring 32 through a limiting network to battery. A circuit is also established from ground, front contact and armature 4 of the PC relay, upper next-to-outermost armature and front contact of the C1 relay, winding of the MR relay to battery and ground. Relay MR operated connects an additional holding ground to the perforator advance magnet and operates relay PAMR. Relay PAMR operated disconnects the original operating ground from the perforator advance magnet and releases the PC relay. Relay PC released, (*a*) lights the PC lamps to indicate to each of the operators that the perforation of the line has occurred, (*b*) releases relays C1, C2 and C3 by breaking their original circuit, (*c*) operates relays KR and KRL, and (*d*) releases relay MR. The circuit for relays KR and KRL may be traced from ground, armature 3 and back contact of the PC relay, armature 2 and back contact of the MC relay to the windings of relays KR and KRL in parallel to ground. The circuit for relay MR is broken at the front contact of armature 4 of the PC relay.

Relay KR operated connects ground to operate all key release magnets. By way of example, the key release magnet 8 controlling the regular keys for the A digit on the control operator's key set is operated from ground, armature 1 and front contact of the KR relay, the winding of the KRM magnet (lower left of Fig. 2) to battery and ground. Other key release magnets are operated in a similar manner.

The operation of the key release magnets releases all operated keys which in turn release all operated register relays. Relay KRL operated locks itself to conductor 9 so that it is not until every operated regular key releases that the relay KRL will release. This will insure that all keys have been released before the keying of the next digit. If for any reason any one of the operated keys should fail to release when the KR relay operates, this locking function of relay KRL will keep relay KR operated thus keeping ground connected to the release magnets and preventing the registering of the next digit until this trouble has been corrected.

The release of relays C1, C2 and C3 releases all perforator punch magnets. Relay PC is made slow to release to insure that the C1, C2 and C3 relays will remain operated long enough to insure the full operation of all perforator punch magnets. Relay MR released releases the perforator advance magnet causing the perforator to step. Relay MR is made slow to release to insure that all perforator punch rods have been withdrawn before the perforator step occurs. Relay MR released also releases relay PAMR. Relay PAMR released reoperates relay PC and partially recloses the circuit for operating the perforator advance magnet. Relay PC reoperated connects ground to the register up-check chain preparatory to the next perforation and extinguishes the PC lamps. Relay PAMR is slow to release to insure against the reoperation of the perforator punch magnets before the stepping of the perforator has been completed which might otherwise occur in the case of repeated perforations as will be described hereinafter. When the digits of each subsequent line are correctly written up by both operators, the operations just described are repeated for each line.

*Manual operation*

When a line containing defective digits is to be perforated or when repeated perforation of a particular line is required, the locking manual control key is operated before the keying of the line, thereby operating relay MC. Relay MC operated (*a*) enables the error keys of all digits by connecting ground to one of the movable contacts of each key, (*b*) opens the circuits of the KR and KRL relays to prevent the automatic restoring of any regular keys upon perforation, (*c*) operates relay SR, (*d*) connects ground to enable the manual perforation and the repeat perforation keys, (*e*) modifies the fundamental check circuit for the operation of the C1, C2 and C3 cut-in relays by disconnecting the up-check chain and placing the control of the C1, C2 and C3 relays under control of the match check chain and the contacts of the LO and MP relays, and (*f*) partially closes a circuit for the operation of the LO relay when relay PC releases after perforation as subsequently described. It may be noted that upon the operation of the MC relay a circuit is established which is closed by either the manual perforation or the repeat perforation keys from ground, front contact and armature 4 of the MC relay, the contacts of either the manual perforation key or the repeat perforation key, armature 5 and front contact of the PC relay, armature 1 and back contact of the LO relay to the winding of the MP relay. With relay MP operated the circuit for the C1, C2 and C3 relays extends from ground, armature 2 and front contact of the PC relay, armature 2 and front contact of the MP relay to the check circuits heretofore described and which heretofore came from armature 5 of the MC relay.

To perforate a line containing defective digits the defective digits are written up on the error keys, one error key being operated for each particular hole desired in the defective digit operating in turn the corresponding C and A register relays. The operation of an error key in any digit also connects ground to the key release magnet of the regular key for that digit thus releasing any regular key button which may have been depressed for the digit by mistake. If a blank digit is desired the N key for that digit is operated. The N key performs no function other than to provide a positive operation by the operator for that digit and to insure the release of any regular key which may have been incorrectly operated for that digit.

The non-defective digits may be written up as usual on the regular keys. In this case, perforation does not occur automatically when both operators have written up the complete line but awaits the operation of the manual perforation key. The operation of the manual perforation key operates the MP relay as described and if the registrations for the line as written by the operators agree, the operation of the MP relay operates the C1, C2 and C3 relays in parallel, these relays functioning as before to perforate the line from the contacts of the operated register relays. Relay MP also locks under control of relay MP1 in its normal position and then operates the relay MP1. The operation of this latter relay removed the locking circuit of relay MP after a slight time interval. This locking arrangement for relay MP is provided in order to insure the operation of relays C1, C2 and C3 and the completion of the perforations in case of a very short operation of the manual perforation key. If either operator has keyed incorrectly the C1, C2 and C3 relays will not operate. The incorrect registrations may be corrected by the operation of the proper key set keys and the operation of the manual perforation key then causes the operation of the cut-in relays to perforate the line.

Relay C1 operated also operates the perforator advance magnet as hereinbefore described and operates the relay MR. Relay MR operated connects an additional holding ground to the perforate advance magnet and operates relay PAMR as before described. Relay PAMR operated disconnects the original operating ground from the perforator advance magnet and releases the PC relay. Relay PC released, (*a*) lights the PC lamps to indicate to the operators that the perforation of the line has occurred, (*b*) releases the cut-in relays, (*c*) releases the MR relay, (*d*) operates the LO relay, and (*e*) releases the MP relay. The circuit for the LO relay may be traced from ground, armature 4 and back contact of the PC relay, normally closed contact of the repeat perforation key, armature 6 and front contact of the MC relay to the winding of the LO relay. Relay LO operated locks under control of the manual perforation key if this key is still operated and opens the circuit to the MP relay. As long as the manual perforation key is held operated, relay LO will be locked operated thus preventing any further perforations until the manual perforation key is released and reoperated. This assures only one perforation for each operation of the manual perforation key. Relay MR released releases the perforator advance magnet causing the perforator to step and releases relay PAMR. Relay PAMR released reoperates the PC relay. The PC relay reoperated extinguishes the PC lamps and releases the LO relay provided the manual perforation key has been released. In case additional lines containing defective digits are to be perforated the manual control key must be left operated and subsequent lines perforated by correcting the settings of the operators' key sets as required for each line and operating the manual perforation key to perforate the lines as just described.

*Perforation of identical lines*

If a definite number of identical lines are to be perforated whether or not these lines contain defective digits this may be done as just hereinbefore described, operating the manual perforation key once for each line to be perforated without any intervening corrections in the settings of the operators' keys. If, however, an approximate number of identical lines is required as in the case of the splice pattern, this can be accomplished more conveniently by operating and holding the repeat perforation key instead of the manual perforation key. The operation of the repeat perforation key operates the MP relay which functions as above described. The operation of the repeat perforation key, however, opens the operating circuit for the LO relay. The circuit then functions as above described to perforate the first line except that relay LO does not function and the operation of relay MP upon the reoperation of relay PC at the end of the first operation cycle immediately operates the cut-in relays to start a new cycle. This process continues so long as the repeat key is held operated causing the same line to be perforated repeatedly at a speed of approximately three per second.

What is claimed is:

1. A device consisting of a control operator's key set, an assistant operator's key set, each said key set having a bank of keys, means for holding each said key in operated position after a manual operation thereof, common key releasing means in each said key set operable for simultaneously releasing all operated keys of each said set, electrical networks controlled by said key sets for transmitting keyed information in code, a recorder having a plurality of recording magnets, connector means operable for interconnecting the said electrical networks of said control operator's key set and said recording magnets to operate said magnets, a code matching circuit responsive to said electrical networks for operating said connector means responsive to a match of information simultaneously keyed at said two operators' key sets, and means controlled by said connector means for operating said key releasing means.

2. A device consisting of a control operator's key set, an assistant operator's key set, each said key set having a bank of keys, means for holding each said key in operated position after a manual operation thereof, common key releasing means in each said key set operable for simultaneously releasing all operated keys of each said set, electrical networks controlled by said key sets for transmitting keyed information in code, a recorder having a plurality of recording magnets, connector means operable for interconnecting the said electrical networks of said control operator's key set and said recording magnets to operate said magnets, a code matching circuit responsive to said electrical networks for operating said connector means responsive to a match of information simultaneously keyed at said two operators' key sets, means controlled by said connector means for operating said key releasing means, key means at said control operator's set for disabling the said control of said key releasing means by said connector means, and a self-interrupting circuit controlled by said last key means for periodically and automatically disabling the said connection from said code matching circuit to said connector means whereby said device will operate repeatedly to record the same information a plurality of times.

3. A device consisting of a control operator's key set, an assistant operator's key set, each said key set having a bank of keys, means for holding each said key in operated position after a manual operation thereof, common key releasing means in each said key set operable for simultaneously releasing all operated keys of each said set, each said key set having keys for representing codes and other keys for representing code elements whereby either perfect codes or mutilated codes may be keyed, electrical networks controlled by said key sets for transmitting perfect codes or mutilated codes, a recorder having a plurality of recording magnets representing the elements of the said codes which may be transmitted, connector means operable for interconnecting the said electrical networks of said control operator's key set and said recording magnets to operate said magnets, a code element matching circuit responsive to said electrical networks for operating said connector means responsive to a match of information simultaneously keyed at said two operators' key sets, and means controlled by said connector means for operating said key releasing means.

4. A device consisting of a control operator's key set, an assistant operator's key set, each said key set having a bank of keys, means for holding each said key in operated position after a manual operation thereof, common key releasing means in each said key set operable for simultaneously releasing all operated keys of each said set, each said key set having keys for representing codes, a plurality of relays operated by said keys, each said relay representing a code element, a matching circuit consisting of pairs of relays for controlling a series circuit, each said pair of relays consisting of a code element relay operated by said control operator's key set and a corresponding code element relay operated by said assistant operator's key set, a portion of said series circuit being normally closed through back contacts of the said relays of a pair and alternatively closed through front contacts of the said relays of the said pair, a recorder having a plurality of recording magnets equal in number and corresponding to the said code element relays operated by said control operator's keys, connector means operable for interconnecting said recording magnets and said code element relays to operate each recording magnet responsive to the operation of its corresponding code element relay, an up-check circuit operated by the said code element relays operated by said control operator's keys, said up-check circuit being in series with said series circuit and said connector means whereby said connector means responds to the closure of said up-check circuit and said series circuit and means responsive to the operation of said connector means for operating said key releasing means.

5. A device consisting of a control operator's key set, an assistant operator's key set, each said key set having a bank of keys, means for holding each said key in operated position after a manual operation thereof, common key releasing means in each said key set operable for simultaneously releasing all operated keys of each said set, each said key set having keys for representing codes, a plurality of relays operated by said keys, each said relay representing a code element, said relays being in a plurality of groups each said group representing a code place, a matching circuit consisting of pairs of relays for controlling a series circuit, each said pair of relays consisting of a code element relay operated by said control operator's key set and a corresponding code element relay operated by said assistant operator's key set, a portion of said series circuit being normally closed through back contacts of the said relays of a pair and alternatively closed through front contacts of the said relays of the said pair, a recorder having a plurality of recording magnets equal in number and corresponding to the said code element relays operated by said control operator's keys, connector means operable for interconnecting said recording magnets and said code element relays to operate each recording magnet responsive to the operation of its corresponding code element relay, an up-check circuit closed through a front contact of at least one of said relays in each of said code place groups, said up-check circuit being in series with said series circuit and said connector means whereby said connector means responds to the closure of said up-check circuit and said series circuit and means responsive to the operation of said connector means for operating said key releasing means.

6. A device consisting of a control operator's key set, an assistant operator's key set, each said key set having a bank of keys, means for holding each said key in operated position after a manual operation thereof, common key releasing means in each said key set operable for simultaneously releasing all operated keys of each said set, each said key set having keys for representing codes, a plurality of relays operated by said keys, each said relay representing a code element, said relays being in a plurality of groups each said group representing a code place, a matching circuit consisting of pairs of relays for controlling a series circuit, each said pair of relays consisting of a code element relay operated by said control operator's key set and a corresponding code element relay operated by said assistant operator's key set, a portion of said series circuit being normally closed through back contacts of the said relays of a pair and alternatively closed through front contacts of the said relays of the said pair, a recorder having a plurality of recording magnets equal in number and corresponding to the said code element relays operated by said control operator's keys, connector means operable for interconnecting said recording magnets and said code element relays to operate each recording magnet responsive to the operation of its corresponding code element relay, an up-check circuit closed through a front contact of at least one of said relays in each of said code place groups, said up-check circuit being in series with said series circuit and said connector means whereby said connector means responds to the closure of said up-check circuit and said series circuit, a normally energized control relay having means when energized to complete said circuit for said connecting means and having means when released to operate said key releasing means, and means controlled by the operation of said connector means for releasing said control relay.

LINDLEY A. KILLE.

REFERENCES CITED

The following references are of record in the file of this patent:

UNITED STATES PATENTS

| Number | Name | Date |
|---|---|---|
| 1,214,983 | Wurts | Feb. 6, 1917 |
| 1,241,268 | Payne | Sept. 25, 1917 |
| 2,074,392 | Herbst | Mar. 23, 1937 |